United States Patent
Yamagishi et al.

(10) Patent No.: US 12,017,918 B2
(45) Date of Patent: Jun. 25, 2024

(54) PRODUCTION METHOD OF A CARBON SHEET

(71) Applicant: ZEON CORPORATION, Tokyo (JP)

(72) Inventors: Tomoko Yamagishi, Tokyo (JP); Mitsugu Uejima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 18/303,567

(22) Filed: Apr. 20, 2023

(65) Prior Publication Data

US 2023/0271835 A1 Aug. 31, 2023

Related U.S. Application Data

(63) Continuation of application No. 17/653,674, filed on Mar. 7, 2022, which is a continuation of application No. 16/647,872, filed as application No. PCT/JP2018/036117 on Sep. 27, 2018, now Pat. No. 11,305,996.

(30) Foreign Application Priority Data

Sep. 28, 2017 (JP) .................. 2017-189154

(51) Int. Cl.
C01B 32/159 (2017.01)

(52) U.S. Cl.
CPC ........ C01B 32/159 (2017.08); *C01P 2006/12* (2013.01)

(58) Field of Classification Search
CPC . C01B 32/159; C01B 2202/02; C01B 32/174; C01B 32/158; C01B 2202/32; C01P 2006/12; Y02E 60/50; B82Y 30/00; B82Y 40/00
See application file for complete search history.

(56) References Cited

U.S. PATENT DOCUMENTS

| | | |
|---|---|---|
| 10,040,686 B2 | 8/2018 | Hata et al. |
| 10,207,929 B2 | 2/2019 | Yamagishi et al. |
| 2008/0318049 A1 | 12/2008 | Hata et al. |
| 2013/0316160 A1 | 11/2013 | Hata et al. |
| 2017/0210627 A1 | 7/2017 | Jayasinghe et al. |
| 2017/0309923 A1 | 10/2017 | Mihara et al. |
| 2017/0369319 A1* | 12/2017 | Yamagishi .............. C01B 32/05 |

FOREIGN PATENT DOCUMENTS

| | | |
|---|---|---|
| CN | 103201214 A | 7/2013 |
| CN | 107073446 A | 8/2017 |
| JP | 2010105909 A | 5/2010 |
| JP | 2012188305 A | 10/2012 |
| JP | 2016175836 A | 10/2016 |
| JP | 2017529298 A | 10/2017 |
| KR | 1020170100501 A | 9/2017 |
| WO | 2006011655 A1 | 2/2006 |
| WO | 2016013245 A1 | 1/2016 |
| WO | 2016103706 A1 | 6/2016 |
| WO | WO 2016/103706 * 6/2016 ............. C01B 31/02 |

OTHER PUBLICATIONS

Das, et al., Engineered Macroporosity in Single-Wall Carbon Nanotube Films, Nano Letters 2009; 9(2): 677-683 (Year: 2009).*
Lin, et al, Correlation of Double-Layer Capacitatnce with the Pore Structure of Sol-Gel Derived Carbon Xerogels, J. Electrochem. Soc. 1999; 146: 3639-3643 (Year: 1999).*
Cranford, et al., In silico assembly and nanomechanical characterization of carbon nanotube buckypaper, Nanotechnology 2010; 21: 265706 (pp. 1-12) (Year: 2010).*
Liu, et al., Correlation between Porosity and Electrical-Mechanical Properties of Carbon Nanotube Buckypaper with Various Porosities, Journal of Nanomaterials 2015; 945091, pp. 1-9 (Year: 2015).
Mar. 31, 2020, International Preliminary Report on Patentability issued in the International Patent Application No. PCT/JP2018/036117.
Nov. 20, 2018, International Search Report issued in the International Patent Application No. PCT/JP2018/036117.
Porosity, accessed online at https://en.wikipedia.org/wiki/Porosity on Dec. 16, 2022 (Year: 2022).

* cited by examiner

*Primary Examiner* — Daniel C. McCracken
(74) *Attorney, Agent, or Firm* — KENJA IP LAW PC

(57) ABSTRACT

Provided is a production method of a carbon sheet having a structure intertwining only carbon nanotubes and having a porosity of 5% to 90%. The method comprises: removing a solvent from a dispersion liquid containing carbon nanotubes, spacer particles, and the solvent to obtain a primary sheet containing the carbon nanotubes and the spacer particles; and removing the spacer particles from the primary sheet. Alternatively, the method comprises: impregnating a porous substrate made from carbon with a dispersion liquid containing carbon nanotubes and a solvent, to obtain a dispersion liquid-impregnated porous substrate; and removing the solvent from the dispersion liquid-impregnated porous substrate. Alternatively, the method comprises: dispersing carbon nanotubes in a solvent to obtain a dispersion liquid, wherein an average bundle diameter of the carbon nanotubes in the dispersion liquid is 0.5 μm or more and 1,000 μm or less; and removing the solvent from the dispersion liquid.

7 Claims, No Drawings

PRODUCTION METHOD OF A CARBON SHEET

CROSS-REFERENCE TO RELATED APPLICATIONS

The present application is a continuation application of U.S. patent application Ser. No. 17/653,674 filed Mar. 7, 2022, which is a continuation application of U.S. patent application Ser. No. 16/647,872 filed Mar. 17, 2020, which is a National Stage Application of PCT/JP2018/036117 filed Sep. 27, 2018, which claims priority of Japanese Patent Application No. 2017-189154 filed Sep. 28, 2017. The disclosures of the prior applications are hereby incorporated by reference herein in their entirety.

TECHNICAL FIELD

The present disclosure relates to a carbon sheet and a method of producing a carbon sheet. More specifically, the present disclosure relates to a carbon nanotube-containing carbon sheet and a method of producing the same.

BACKGROUND

Carbon nanotubes (hereinafter, also referred to as "CNTs") have been attracting attention in recent years as light-weight materials that also have excellent electrical conductivity, thermal conductivity, and mechanical properties.

It has been proposed that due to CNTs having a large surface area, a different material may be supported on the surfaces of CNTs so that the CNTs can be used as a CNT composite material that is provided with another function such as catalytic activity (for example, refer to Patent Literature (PTL) 1).

On the other hand, CNTs are fine structures having nanometer-size diameters, which means that individual CNTs have poor handleability and processability. In view of the above, it has been proposed that by producing a solution in which CNTs are dispersed and then carrying out paper-making using this solution, for example, multiple CNTs can be caused to assemble into the form of a film and can be used as a carbon nanotube film referred to as "buckypaper" (for example, refer to PTL 2).

Moreover, it has been reported that a CNT sheet containing CNTs that have a median length and an aspect ratio that are not less than specific values and that are arranged in a randomly oriented, uniformly distributed pattern, and in which the CNT basis weight is not less than a specific value, can have electromagnetic wave absorption characteristics (for example, refer to PTL 3).

It has also been reported that an infrared absorbing member containing a CNT assembly in which CNTs are oriented in a length direction can have high infrared absorbance (for example, refer to PTL 4).

CITATION LIST

Patent Literature

PTL 1: WO 2016/013245 A1
PTL 2: JP 2010-105909 A
PTL 3: JP 2017-529298 A
PTL 4: JP 2012-188305 A

SUMMARY

Technical Problem

Studies carried out by the inventors have revealed that in a case in which buckypaper is used to support a different material from a viewpoint of obtaining a CNT composite material having excellent handleability and processability, the different material cannot penetrate to an inner part of the buckypaper due to the dense structure thereof.

Accordingly, one objective of the present disclosure is to provide a material that has excellent handleability and processability, and that when used as a support for a different material, enables support of the different material up to an inner part thereof.

The inventors conducted further studies, and when they attempted to use the buckypaper described above as an electromagnetic wave absorbing material and/or infrared absorbing material, the inventors found that electromagnetic wave absorption characteristics and infrared absorption characteristics were inadequate.

Accordingly, another objective of the present disclosure is to provide a material having excellent electromagnetic wave absorption characteristics and infrared absorption characteristics.

Solution to Problem

The inventors conducted diligent studies with the aim of solving the problems set forth above. The inventors discovered that a carbon sheet containing one or more carbon nanotubes and having a porosity within a specific range has excellent handleability and processability, and when used as a support for a different material, enables support of the different material up to an inner part of the sheet, and, in this manner, the inventors completed the present disclosure.

Specifically, the present disclosure aims to advantageously solve the problems set forth above by disclosing a carbon sheet comprising one or more carbon nanotubes and having a porosity of not less than 5% and not more than 90%. A carbon sheet that contains carbon nanotubes and has a porosity within the numerical range set forth above in this manner has excellent handleability and processability, and when used as a support for a different material, enables support of the different material up to an inner part of the sheet.

Note that the porosity referred to in the present disclosure can be measured by mercury intrusion porosimetry.

The presently disclosed carbon sheet set forth above preferably comprises: a porous substrate made from carbon; and the carbon nanotubes, attached to the porous substrate. Through inclusion of a porous substrate made from carbon and carbon nanotubes attached to the porous substrate, the porosity of an inner part of the carbon sheet increases, and thus a larger amount of a different material can be supported up to the inner part of the carbon sheet. Moreover, mechanical strength of the carbon sheet can be increased, and thus the carbon sheet can be provided with excellent processability.

The inventors also discovered that a carbon sheet containing one or more carbon nanotubes and having a void fraction within a specific range has excellent electromagnetic wave absorption characteristics and infrared absorption characteristics, and, in this manner, completed the present disclosure.

Specifically, the present disclosure aims to advantageously solve the problems set forth above by disclosing a carbon sheet comprising one or more carbon nanotubes and having a void fraction of not less than 30% and not more than 95%. A carbon sheet that contains carbon nanotubes and has a void fraction within a specific range in this manner has excellent electromagnetic wave absorption characteristics and infrared absorption characteristics.

Note that the void fraction referred to in the present disclosure can be measured by a method described in the EXAMPLES section of the present specification.

In the presently disclosed carbon sheet, the carbon nanotubes are preferably single-walled carbon nanotubes. By using single-walled carbon nanotubes, a larger amount of a different material can be supported on the surfaces of the carbon nanotubes, and electromagnetic wave absorption characteristics and infrared absorption characteristics of the carbon sheet can be further enhanced.

In the presently disclosed carbon sheet, the carbon nanotubes preferably have a nitrogen adsorption specific surface area of 600 $m^2$/g or more. By using carbon nanotubes having a nitrogen adsorption specific surface area of 600 $m^2$/g or more, a larger amount of a different material can be supported on the surfaces of the carbon nanotubes, and electromagnetic wave absorption characteristics and infrared absorption characteristics of the carbon sheet can be further enhanced.

Note that the nitrogen adsorption specific surface area of the carbon nanotubes referred to in the present disclosure can be measured in accordance with the BET (Brunauer-Emmett-Teller) method using a fully automated specific surface area analyzer (produced by Mountech Co., Ltd.; product name: Macsorb® HM model-1210 (Macsorb is a registered trademark in Japan, other countries, or both)).

The presently disclosed carbon sheet is preferably composed of only the carbon nanotubes. When the carbon sheet is composed of only carbon nanotubes, the weight of the carbon sheet can be reduced. Moreover, in a configuration in which the carbon sheet is formed using only carbon nanotubes, the void fraction of the carbon sheet can be adjusted, and thus electromagnetic wave absorption characteristics and infrared absorption characteristics of the carbon sheet can be further enhanced, by appropriately altering the conditions under which the carbon nanotubes are dispersed in a solvent or the like.

Advantageous Effect

According to the present disclosure, it is possible to provide a carbon sheet that has excellent handleability and processability, and that when used as a support for a different material, enables support of the different material up to an inner part of the sheet.

Moreover, according to the present disclosure, it is possible to provide a material that has excellent electromagnetic wave absorption characteristics and infrared absorption characteristics.

DETAILED DESCRIPTION

The following provides a detailed description of embodiments of the present disclosure.

The presently disclosed carbon sheet contains one or more carbon nanotubes and has a porosity and/or void fraction that is within a specific range.
(Carbon Sheet Having Defined Porosity)

The presently disclosed carbon sheet that has a porosity within a specific range can suitably be used as a support for a different material such as a metal (tin, platinum, gold, palladium, etc.) or a metal oxide (silicon oxide, lithium oxide, lithium titanate, etc.). These different materials may, for example, be in the form of particles of 5 μm or smaller.
<Carbon Sheet>

The presently disclosed carbon sheet contains one or more carbon nanotubes, has a porosity within a specific range, and may optionally include a porous substrate made from carbon. The presently disclosed carbon sheet that has a porosity within the aforementioned specific range has excellent handleability and processability, and when used as a support for a different material, enables support of the different material up to an inner part of the sheet.

Note that the presently disclosed carbon sheet that has a porosity within a specific range is a sheet that contains only carbon. However, the phrase "only carbon" used in the above description does not rule out the inclusion of small amounts of components other than carbon, such as impurities.
<<Structure of Carbon Sheet>>

More specifically, the presently disclosed carbon sheet that has a porosity within a specific range may, for example, have a structure such as (1) a structure in which only carbon nanotubes are intertwined in a manner such that the porosity is not less than 5% and not more than 90%, or (2) a structure in which carbon nanotubes are attached to a porous substrate made from carbon in a manner such that the porosity is not less than 5% and not more than 90%. Note that a carbon sheet having structure (1) is light and easy to handle. Moreover, such a carbon sheet can suitably be used as a support for a different material. On the other hand, the use of a porous substrate in the case of a sheet having structure (2) makes it easy to increase the porosity of an inner part of the carbon sheet, and can also increase mechanical strength of the carbon sheet and provide the carbon sheet with excellent processability.
<<Properties of Carbon Sheet>>

The carbon sheet preferably also has the following properties.
[Porosity]

The porosity in the presently disclosed carbon sheet that has a porosity within a specific range is required to be 5% or more, and is preferably 40% or more, more preferably 48% or more, and even more preferably 70% or more. Moreover, the porosity is required to be 90% or less, and is preferably 88% or less. When the porosity of the carbon sheet is 5% or more, sufficient space in an inner part of the carbon sheet can be ensured, and thus a different material can be well supported up to the inner part of the sheet when the carbon sheet is used as a support for the different material. Moreover, when the porosity is 90% or less, sufficient free-standing ability of the carbon sheet can be ensured, and thus a carbon sheet having good handleability and processability can be provided.
[Thickness]

The thickness of the carbon sheet is preferably 2 μm or more, more preferably 5 μm or more, and even more preferably 10 μm or more. Moreover, the thickness of the carbon sheet is preferably 5,000 μm or less, more preferably 4,500 μm or less, and even more preferably 4,000 μm or less. When the thickness of the carbon sheet is 2 μm or more, strength of the obtained carbon sheet can be ensured. As a result, processability of the carbon sheet can be increased. On the other hand, good handleability of the obtained carbon sheet can be maintained when the thickness of the carbon sheet is 5,000 μm or less.

[Density]

The density of the carbon sheet is preferably 0.01 g/cm$^3$ or more, more preferably 0.1 g/cm$^3$ or more, and even more preferably 0.50 g/cm$^3$ or more, and is preferably 1.80 g/cm$^3$ or less, more preferably 1.50 g/cm$^3$ or less, and even more preferably 1.20 g/cm$^3$ or less. When the density of the carbon sheet is 0.01 g/cm$^3$ or more, strength of the obtained carbon sheet can be ensured. As a result, processability of the carbon sheet can be increased. On the other hand, a larger amount of a different material can be supported up to an inner part of the carbon sheet when the density of the carbon sheet is 1.80 g/cm$^3$ or less.

Note that the "density of the carbon sheet" referred to in the present disclosure is the "bulk density", which can be determined by measuring the mass, area, and thickness of the carbon sheet, and then dividing the mass of the carbon sheet by the volume (area×thickness) of the carbon sheet.

<<Carbon Nanotubes>>

The carbon nanotubes contained in the presently disclosed carbon sheet are not specifically limited and may be single-walled carbon nanotubes and/or multi-walled carbon nanotubes, but are preferably CNTs having from 1 to 5 walls, and more preferably single-walled CNTs. When single-walled CNTs are used, a larger amount of a different material can be supported on the surfaces of the carbon nanotubes compared to a case in which multi-walled CNTs are used.

The average diameter of the CNTs is preferably 0.5 nm or more, more preferably 1 nm or more, and even more preferably 2 nm or more, and is preferably 15 nm or less, more preferably 10 nm or less, and even more preferably 5 nm or less. When the average diameter of the CNTs is 0.5 nm or more, sufficient space between CNTs can be ensured when producing the carbon sheet. This enables good support of a different material by the CNTs when the carbon sheet is used as a support for the different material. Moreover, when the average diameter of the CNTs is 15 nm or less, physical properties of the carbon sheet, such as electrical conductivity, can be enhanced.

Note that the "average diameter of the CNTs" can be determined by measuring the diameters (external diameters) of 100 randomly selected CNTs using a transmission electron microscope. Moreover, the average diameter of the CNTs may be adjusted by altering the production method and production conditions of the CNTs, or may be adjusted by combining a plurality of types of CNTs that are obtained by different production methods.

The aspect ratio (length/diameter) of the CNTs is preferably more than 10. Note that the aspect ratio of the CNTs can be determined by measuring the diameters and lengths of 100 randomly selected CNTs using a transmission electron microscope, and then calculating an average value of the ratio of diameter and length (length/diameter).

The nitrogen adsorption specific surface area of the CNTs is preferably 600 m$^2$/g or more, more preferably 800 m$^2$/g or more, and even more preferably 1,000 m$^2$/g or more. Moreover, the nitrogen adsorption specific surface area of the CNTs is preferably 2,500 m$^2$/g or less, and more preferably 1,600 m$^2$/g or less. When the nitrogen adsorption specific surface area of the CNTs is 600 m$^2$/g or more, a larger amount of a different material can be supported on the surfaces of the carbon nanotubes in the carbon sheet. Moreover, when the nitrogen adsorption specific surface area of the CNTs is 2,500 m$^2$/g or less, this inhibits excessively dense packing of the CNTs and enables good support of a different material by the CNTs when the carbon sheet is used as a support for the different material.

CNTs having the properties set forth above can be efficiently produced, for example, by a method in which, during synthesis of CNTs through chemical vapor deposition (CVD) by supplying a feedstock compound and a carrier gas onto a substrate having a catalyst layer for carbon nanotube production at the surface thereof, a trace amount of an oxidant (catalyst activating material) is provided in the system so as to dramatically improve catalytic activity of the catalyst layer (super growth method; refer to WO 2006/011655 A1). Hereinafter, carbon nanotubes that are obtained by the super growth method are also referred to as "SGCNTs".

<<Porous Substrate Made from Carbon>>

The porous substrate made from carbon is composed of only a carbon material.

Note that "only" in the above description does not rule out the inclusion of small amounts of components other than the carbon material, such as impurities.

Examples of the porous substrate made from carbon include, but are not specifically limited to, graphite, woven fabric or non-woven fabric of carbon fiber, and carbon paper.

One of these materials may be used individually, or two or more of these materials may be used as a mixture.

Although no specific limitations are placed on the porosity of the porous substrate made from carbon, the porosity of the porous substrate is preferably 5% or more, more preferably 40% or more, and even more preferably 70% or more from a viewpoint of increasing the porosity of the produced carbon sheet. Moreover, the porosity of the porous substrate is preferably 90% or less.

<Production Method of Carbon Sheet Having Defined Porosity>

No specific limitations are placed on the production method of the presently disclosed carbon sheet set forth above. For example, the production method of the carbon sheet having the previously described structure (1) may be the following method 1) and the production method of the carbon sheet having the previously described structure (2) may be the following method 2).

1) A method in which solvent is removed from a dispersion liquid containing CNTs, spacer particles, and a solvent to obtain a primary sheet and then the spacer particles are removed from the primary sheet
2) A method in which a porous substrate made from carbon is impregnated with a dispersion liquid containing CNTs and a solvent and then the solvent is removed Method 1) in which a carbon sheet composed of only CNTs is obtained is preferable from a viewpoint of providing a lighter carbon sheet.

On the other hand, method 2) in which a carbon sheet having higher porosity is obtained through inclusion of a porous substrate made from carbon and CNTs attached to the porous substrate is preferable from a viewpoint of supporting a larger amount of a different material up to an inner part of the carbon sheet.

<<Carbon Sheet Production Method 1)>>

In more detail, carbon sheet production method 1) includes a step of removing solvent from a dispersion liquid containing CNTs, spacer particles, and a solvent to obtain a primary sheet containing the CNTs and the spacer particles (primary sheet production step) and a step of removing the spacer particles from the primary sheet (spacer particle removal step).

[Primary Sheet Production Step]

In the primary sheet production step, solvent is removed from a dispersion liquid containing carbon nanotubes, spacer particles, and a solvent to obtain a primary sheet that contains the carbon nanotubes and the spacer particles.

—Dispersion Liquid—

The dispersion liquid used in production of the primary sheet is not specifically limited and may be a dispersion liquid obtained by dispersing an assembly of CNTs and spacer particles in a solvent using a known method of dispersing treatment. Specifically, the dispersion liquid may be a dispersion liquid that contains CNTs, spacer particles, and a solvent, and that optionally further contains dispersion liquid additives such as a dispersant.

——Components in Dispersion Liquid——

The CNTs may be the CNTs that were previously described in the "Carbon sheet" section.

The spacer particles are not specifically limited so long as they disperse well in the dispersion liquid and are efficiently removed in the spacer particle removal step.

Examples of types of spacer particles that can be used include carbon black, glass particles, titanium oxide particles, aluminum oxide particles, and resin particles. In a case in which the spacer particle removal step is implemented through heat treatment, the spacer particles are preferably resin particles, and more preferably hollow resin particles from a viewpoint of efficiently removing the spacer particles through heating.

Specific examples of resins that can be used as the resin particles include plastics (polyethylene, polypropylene, polystyrene, ABS resin, methacrylic resin, polyvinyl chloride, polyamide, polyacetal, polycarbonate, polybutylene terephthalate, polyethylene terephthalate, polyphenylene oxide, polyamide-imide, polyether ether ketone, polyphenylene sulfide, polytetrafluoroethylene, phenolic resin, urea resin, melamine resin, unsaturated polyester resin, epoxy resin, etc.), synthetic rubbers (isoprene rubber, butadiene rubber, styrene-butadiene rubber, chloroprene rubber, nitrile rubber, polyisobutylene rubber, ethylene propylene rubber, chlorosulfonated polyethylene, acrylic rubber, fluororubber, epichlorohydrin rubber, urethane rubber, silicone rubber, etc.), and natural rubbers.

One of these resins may be used individually, or two or more of these resins may be used as a mixture.

The particle diameter of the spacer particles is not specifically limited so long as it does not impair formation of the primary sheet and the carbon sheet in the form of sheets, but is preferably 5 nm or more, more preferably 10 nm or more, and even more preferably 100 nm or more, and is preferably 1,000 nm or less, more preferably 800 nm or less, and even more preferably 600 nm or less.

Examples of the solvent of the dispersion liquid (i.e., the dispersion medium of the CNTs and the spacer particles) include, but are not specifically limited to, water; alcohols such as methanol, ethanol, n-propanol, isopropanol (isopropyl alcohol), n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide-based polar organic solvents such as N,N-dimethylformamide and N-methylpyrrolidone; and aromatic hydrocarbons such as toluene, xylene, chlorobenzene, orthodichlorobenzene, and paradichlorobenzene. One of these solvents may be used individually, or two or more of these solvents may be used as a mixture.

Examples of dispersion liquid additives that may optionally be compounded in the dispersion liquid include additives typically used in production of dispersion liquids, such as dispersants, without any specific limitations.

Note that the additive amount of a dispersion liquid additive such as a dispersant is preferably low from a viewpoint of preventing filter paper blocking in a situation in which the solvent is removed from the dispersion liquid by filtration and a viewpoint of inhibiting deterioration of physical properties (for example, electrical conductivity) of the obtained carbon sheet, for example.

A surfactant, a synthetic polymer, or a natural polymer can be adopted as a dispersant used in production of the dispersion liquid without any specific limitations other than that it enables dispersion of the CNTs and the spacer particles and can dissolve in the previously described solvent.

Examples of surfactants that can be used include sodium dodecylsulfonate, sodium deoxycholate, sodium cholate, and sodium dodecylbenzenesulfonate.

Examples of synthetic polymers that can be used include polyether diols, polyester diols, polycarbonate diols, polyvinyl alcohol, partially saponified polyvinyl alcohol, acetoacetyl group-modified polyvinyl alcohol, acetal group-modified polyvinyl alcohol, butyral group-modified polyvinyl alcohol, silanol group-modified polyvinyl alcohol, ethylene-vinyl alcohol copolymers, ethylene-vinyl alcohol-vinyl acetate copolymer resins, dimethylaminoethyl acrylate, dimethylaminoethyl methacrylate, acrylic resins, epoxy resins, modified epoxy resins, phenoxy resins, modified phenoxy resins, phenoxy ether resins, phenoxy ester resins, fluororesins, melamine resins, alkyd resins, phenolic resins, polyacrylamide, polyacrylic acid, polystyrene sulfonic acid, polyethylene glycol, and polyvinyl pyrrolidone.

Examples of natural polymers that can be used include polysaccharides such as starch, pullulan, dextran, dextrin, guar gum, xanthan gum, amylose, amylopectin, alginic acid, gum Arabic, carrageenan, chondroitin sulfate, hyaluronic acid, curdlan, chitin, chitosan, cellulose, and salts and derivatives thereof.

One of these dispersants may be used individually, or two or more of these dispersants may be used as a mixture.

——Properties of Dispersion Liquid——

The concentration of the CNTs in the dispersion liquid depends on the type of CNTs that are used, but is preferably not less than 0.001 mass % and not more than 5 mass %. If the CNT concentration is less than 0.001 mass %, the amount of carbon sheet obtained through removal of the solvent and the spacer particles decreases, and it may not be possible to achieve sufficiently high production efficiency. Moreover, if the CNT concentration is more than 5 mass %, dispersibility of the CNTs in the dispersion liquid may decrease, viscosity of the dispersion liquid increases, and fluidity of the dispersion liquid decreases.

——Production of Dispersion Liquid——

The dispersion liquid can be produced by a known method of dispersing treatment such as dispersing treatment by a jet mill, dispersing treatment by high-shear stirring, or dispersing treatment using a BERYU SYSTEM PRO (product name; produced by Beryu corp.).

Also note that addition of the spacer particles to the dispersion liquid can be performed at any timing without any specific limitations so long as the desired effects are obtained. For example, the spacer particles can be added during addition of the CNTs to the solvent to produce a coarse dispersion liquid.

—Solvent Removal—

Known solvent removal methods such as drying and filtration can be used as the method by which the solvent is removed from the dispersion liquid without any specific limitations. Of such methods, the use of drying under reduced pressure, vacuum drying, or filtration as the solvent removal method is preferable from a viewpoint of efficiently removing the solvent. Moreover, the solvent removal method is preferably filtration, and more preferably filtration under reduced pressure from a viewpoint of simple and fast removal of the solvent. By quickly and efficiently removing the solvent, reaggregation of the dispersed CNTs and spacer particles can be inhibited, and uneven density of the obtained carbon sheet can be inhibited.

Note that it is not essential that the solvent in the dispersion liquid is completely removed, and some of the solvent may remain so long as the CNTs and spacer particles remaining after solvent removal are in a state that enables handling thereof as an assembly (primary sheet).

[Spacer Particle Removal Step]

In the spacer particle removal step, the spacer particles are removed from the primary sheet obtained through the primary sheet production step described above to obtain a carbon sheet.

The method by which the spacer particles are removed from the primary sheet described above is not specifically limited and may be a known method of removing spacer particles from a substrate.

Specifically, a method such as causing detachment of the spacer particles by imparting physical shock on the primary sheet or removing the spacer particles by heat treatment may be adopted. Of these methods, removal of the spacer particles by heat treatment is preferable from a viewpoint of more efficiently removing the spacer particles and increasing porosity of an inner part of the carbon sheet.

Note that in a case in which a method involving heat treatment is adopted, the used spacer particles are preferably a material that is easily removed by heat treatment, such as hollow resin particles.

Note that it is not essential that the spacer particles in the primary sheet are completely removed, and a small amount of the spacer particles may remain so long as this does not affect the performance of the carbon sheet obtained after spacer particle removal.

<<Carbon Sheet Production Method 2)>>

In more detail, carbon sheet production method 2) includes a step of impregnating a porous substrate made from carbon with a dispersion liquid containing CNTs and a solvent (dispersion liquid impregnation step) and a step of removing the solvent from the dispersion liquid-impregnated porous substrate (solvent removal step). Moreover, the production method 2) may optionally include a washing step performed once or a plurality of times before and/or after the solvent removal step. Moreover, in a case in which a washing step is implemented after the solvent removal step, a solvent removal step may be implemented once again after the washing step. Furthermore, washing steps and solvent removal steps may be implemented repeatedly in carbon sheet production method 2).

[Dispersion Liquid Impregnation Step]

In the dispersion liquid impregnation step, a porous substrate made from carbon is impregnated with a dispersion liquid containing CNTs and a solvent to obtain a dispersion liquid-impregnated porous substrate.

—Dispersion Liquid—

A dispersion liquid obtained by dispersing an assembly of CNTs in a solvent by a known method of dispersing treatment can be adopted without any specific limitations as the dispersion liquid used in the dispersion liquid impregnation step. Specifically, the dispersion liquid can be a dispersion liquid that contains CNTs and a solvent, and that optionally further contains dispersion liquid additives such as a dispersant.

——Components of Dispersion Liquid——

The CNTs, solvent, and dispersion liquid additives used in the dispersion liquid may be the same as any of those that can be used in the dispersion liquid used in carbon sheet production method 1). The properties and production method of the dispersion liquid may also be the same as those of the dispersion liquid used in carbon sheet production method 1).

—Porous Substrate Made from Carbon—

The porous substrate made from carbon that was previously described in the "Carbon sheet" section can be adopted as the porous substrate made from carbon that is used in the dispersion liquid impregnation step.

—Method of Impregnation of Porous Substrate Made from Carbon with Dispersion Liquid—

Any known method can be adopted as the method by which the porous substrate made from carbon is impregnated with the dispersion liquid without any specific limitations so long as the porous substrate can be uniformly impregnated with the dispersion liquid. Specifically, a method such as applying the dispersion liquid onto the porous substrate, spraying the dispersion liquid onto the porous substrate, or immersing the porous substrate in the dispersion liquid may be adopted.

[Solvent Removal Step]

In the solvent removal step, the solvent is removed from the dispersion liquid-impregnated porous substrate described above to obtain a carbon sheet.

Known solvent removal methods such as drying can be used as the method by which the solvent is removed from the dispersion liquid-impregnated porous substrate without any specific limitations. Of such methods, the use of drying under reduced pressure or vacuum drying as the solvent removal method is preferable from a viewpoint of efficiently removing the solvent. Efficient removal of the solvent can inhibit reaggregation of CNTs that have been dispersed and can inhibit uneven density of the obtained carbon sheet.

[Washing Step]

Carbon sheet production method 2) may optionally include a washing step performed once or a plurality of times before and/or after the solvent removal step described above.

In the washing step, the dispersion liquid-impregnated porous substrate obtained through the dispersion liquid impregnation step or the carbon sheet obtained through the solvent removal step is washed to remove dispersant, originating from the dispersion liquid, from the dispersion liquid-impregnated porous substrate or the carbon sheet.

The specific method of washing may be a known washing method without any specific limitations so long as it enables suitable removal of dispersant from the dispersion liquid-impregnated porous substrate or the carbon sheet and does not cause detachment of the CNTs that are attached to the porous substrate made from carbon. Specifically, a method such as rinsing the dispersion liquid-impregnated porous substrate or the carbon sheet with a washing liquid or immersing the dispersion liquid-impregnated porous substrate or the carbon sheet in a washing liquid may be adopted.

The washing liquid used in the washing step described above is not specifically limited, and the solvent of the dispersion liquid described above may, for example, be used as the washing liquid.

Note that it is not essential that dispersant contained in the dispersion liquid-impregnated porous substrate or carbon sheet is completely removed, and the dispersant may remain to the extent that the desired effects can still be achieved.

(Carbon Sheet Having Defined Void Fraction)

The presently disclosed carbon sheet that has a void fraction within a specific range can display excellent electromagnetic wave absorption characteristics, and thus can suitably be adopted as an electromagnetic wave absorbing material used in an electronic device, a communication device, or the like. Moreover, the presently disclosed carbon sheet that has a void fraction within a specific range can display excellent infrared absorption characteristics, and thus can suitably be adopted as an infrared absorbing material used in a heat proof sheet or the like.

<Carbon Sheet>

The presently disclosed carbon sheet has excellent electromagnetic wave absorption characteristics and infrared absorption characteristics as a result of containing one or more carbon nanotubes and having a void fraction that is within a specific range. The presently disclosed carbon sheet that has a void fraction within a specific range is a sheet that contains only carbon. The phrase "only carbon" used in the above description does not rule out the inclusion of small amounts of components other than carbon, such as impurities.

<<Structure of Carbon Sheet>>

Specifically, the presently disclosed carbon sheet that has a void fraction within a specific range may have a structure such as (3) a structure in which only carbon nanotubes are intertwined in a manner such that the void fraction is not less than 30% and not more than 95%.

<<Properties of Carbon Sheet>>

The carbon sheet preferably also has the following properties.

[Void Fraction]

The void fraction in the presently disclosed carbon sheet that has a void fraction within a specific range is required to be 30% or more, and is preferably 35% or more, and more preferably 40% or more. Moreover, the void fraction is required to be 95% or less, and is preferably 94% or less, and more preferably 93% or less. When the void fraction of the carbon sheet is 30% or more, electromagnetic wave absorption characteristics and infrared absorption characteristics of the carbon sheet can be further enhanced. Moreover, when the void fraction is 95% or less, sufficient free-standing ability of the carbon sheet can be ensured, and thus a carbon sheet having good handleability and processability can be provided.

[Porosity]

In addition to having a void fraction that is within any of the specific ranges set forth above, the presently disclosed carbon sheet may have a specific porosity such as previously described in the "Carbon sheet having defined porosity" section. In other words, the porosity in the presently disclosed carbon sheet that has a void fraction within a specific range may be within any of the specific ranges previously described in the "Carbon sheet having defined porosity" section.

Specifically, the porosity of the presently disclosed carbon sheet that has a void fraction within a specific range is preferably 5% or more, more preferably 40% or more, even more preferably 48% or more, and further preferably 70% or more. Moreover, the porosity is preferably 90% or less, and more preferably 88% or less. When the porosity of the carbon sheet is 5% or more, sufficient space in an inner part of the carbon sheet can be ensured, and good support of a different material up to the inner part of the carbon sheet can be achieved when the carbon sheet is used as a support for the different material. Moreover, when the porosity is 90% or less, sufficient free-standing ability of the carbon sheet can be ensured, and thus a carbon sheet having good handleability and processability can be provided.

[Thickness]

The thickness of the carbon sheet is preferably 2 μm or more, more preferably 5 μm or more, and even more preferably 10 μm or more. Moreover, the thickness of the carbon sheet is preferably 5,000 μm or less, more preferably 4,500 μm or less, and even more preferably 4,000 μm or less. When the thickness of the carbon sheet is 2 μm or more, strength of the obtained carbon sheet can be ensured. As a result, processability of the carbon sheet can be increased. On the other hand, good handleability of the obtained carbon sheet can be maintained when the thickness of the carbon sheet is 5,000 μm or less.

[Density]

The density of the carbon sheet is preferably 0.01 g/cm$^3$ or more, more preferably 0.1 g/cm$^3$ or more, and even more preferably 0.50 g/cm$^3$ or more, and is preferably 1.80 g/cm$^3$ or less, more preferably 1.50 g/cm$^3$ or less, and even more preferably 1.20 g/cm$^3$ or less. When the density of the carbon sheet is 0.01 g/cm$^3$ or more, strength of the obtained carbon sheet can be ensured. As a result, processability of the carbon sheet can be increased. On the other hand, electromagnetic wave absorption characteristics and infrared absorption characteristics of the carbon sheet can be further enhanced when the density of the carbon sheet is 1.80 g/cm$^3$ or less.

Note that the "density of the carbon sheet" referred to in the present disclosure is the "bulk density", which can be determined by measuring the mass, area, and thickness of the carbon sheet, and then dividing the mass of the carbon sheet by the volume (area×thickness) of the carbon sheet.

<<Carbon Nanotubes>>

The carbon nanotubes contained in the presently disclosed carbon sheet are not specifically limited and may be single-walled carbon nanotubes and/or multi-walled carbon nanotubes, but are preferably CNTs having from 1 to 5 walls, and more preferably single-walled CNTs. By using single-walled CNTs, electromagnetic wave absorption characteristics and infrared absorption characteristics of the carbon sheet can be further enhanced compared to a case in which multi-walled CNTs are used.

The average diameter of the CNTs is preferably 0.5 nm or more, more preferably 1 nm or more, and even more preferably 2 nm or more, and is preferably 15 nm or less, more preferably 10 nm or less, and even more preferably 5 nm or less. When the average diameter of the CNTs is 0.5 nm or more, sufficient space between the CNTs can be ensured when producing the carbon sheet. Moreover, when the average diameter of the CNTs is 15 nm or less, physical properties such as electromagnetic wave absorption characteristics, infrared absorption characteristics, and electrical conductivity of the carbon sheet can be enhanced.

Note that the "average diameter of the CNTs" can be determined by measuring the diameters (external diameters) of 100 randomly selected CNTs using a transmission electron microscope. Moreover, the average diameter of the CNTs may be adjusted by altering the production method and production conditions of the CNTs, or may be adjusted by combining a plurality of types of CNTs that are obtained by different production methods.

The aspect ratio (length/diameter) of the CNTs is preferably more than 10. Note that the aspect ratio of the CNTs can be determined by measuring the diameters and lengths of 100 randomly selected CNTs using a transmission electron microscope, and then calculating an average value of the ratio of diameter and length (length/diameter).

The nitrogen adsorption specific surface area of the CNTs is preferably 600 m$^2$/g or more, more preferably 800 m$^2$/g or more, and even more preferably 1,000 m$^2$/g or more. Moreover, the nitrogen adsorption specific surface area of the CNTs is preferably 2,500 m$^2$/g or less, and more preferably 1,600 m$^2$/g or less. When the nitrogen adsorption specific surface area of the CNTs is within any of the ranges set forth above, electromagnetic wave absorption characteristics and infrared absorption characteristics of the carbon sheet can be further enhanced.

CNTs having the properties set forth above can be efficiently produced, for example, by a method in which, during synthesis of CNTs through chemical vapor deposition (CVD) by supplying a feedstock compound and a carrier gas onto a substrate having a catalyst layer for carbon nanotube production at the surface thereof, a trace amount of an oxidant (catalyst activating material) is provided in the system so as to dramatically improve catalytic activity of the catalyst layer (super growth method; refer to WO 2006/011655 A1). Hereinafter, carbon nanotubes that are obtained by the super growth method are also referred to as "SGCNTs".

<Production Method of Carbon Sheet Having Defined Void Fraction>

The method by which the presently disclosed carbon sheet set forth above is produced is not specifically limited but is preferably the following method 3), for example, from a viewpoint of producing a carbon sheet that has a void fraction within any of the specific ranges set forth above.

3) A method in which solvent is removed from a dispersion liquid obtained by dispersing CNTs in a solvent <<Carbon Sheet Production Method 3)>>

In more detail, carbon sheet production method 3) includes a step of dispersing CNTs in a solvent to obtain a dispersion liquid (dispersion liquid production step) and a step of removing the solvent from the dispersion liquid (solvent removal step).

[Dispersion Liquid Production Step]

In the dispersion liquid production step, CNTs are dispersed in a solvent to obtain a CNT dispersion liquid.

The CNTs may be the CNTs that were previously described in the "Carbon sheet" section.

Moreover, the solvent may be any of the previously described solvents that can be used in carbon sheet production method 1).

The method by which the CNTs are dispersed in the solvent is not specifically limited and may be a known method of dispersing treatment such as dispersing treatment by ultrasound, dispersing treatment by a jet mill, dispersing treatment by high-shear stirring, or dispersing treatment using a BERYU SYSTEM PRO (product name; produced by Beryu corp.).

The CNTs in the obtained CNT dispersion liquid are normally present in the form of "bundles" in which a plurality of CNTs are assembled.

The average bundle diameter of the CNTs can be adjusted by altering the method of the above-described dispersing treatment, the conditions thereof, and so forth.

The average bundle diameter of the CNTs in the CNT dispersion liquid is preferably 0.5 µm or more, and is preferably 1,000 µm or less, and more preferably 100 µm or less. When the average bundle diameter of the CNTs in the CNT dispersion liquid is 0.5 µm or more, the void fraction of the produced carbon sheet can be sufficiently increased. On the other hand, an excessive increase in the void fraction of the produced carbon sheet can be inhibited when the average bundle diameter of the CNTs in the CNT dispersion liquid is 1,000 µm or less. Therefore, it is easy to keep the void fraction of the produced carbon sheet within any of the specific ranges set forth above when the average bundle diameter of the CNTs dispersed in the solvent is within any of the specific ranges set forth above.

Note that the average bundle diameter of the CNTs can be measured by a method described in the EXAMPLES section of the present specification.

[Solvent Removal Step]

In the solvent removal step, the solvent is removed from the CNT dispersion liquid to obtain a carbon sheet.

The method by which the solvent is removed from the dispersion liquid may be any of the previously described methods that can be used in the solvent removal step of carbon sheet production method 1).

EXAMPLES

The following provides a more specific description of the present disclosure based on examples. However, the present disclosure is not limited to the following examples.

In the examples and comparative examples, the following methods were used to evaluate the free-standing ability, electrical conductivity, porosity, air permeability, thickness, density (bulk density), void fraction, electromagnetic wave absorption characteristics, and infrared absorption characteristics of a carbon sheet, and the average bundle diameter of CNTs.

<Free-Standing Ability of Carbon Sheet>

A produced carbon sheet was inspected by eye to confirm whether or not the carbon sheet maintained a film state on its own, and the free-standing ability of the carbon sheet was evaluated by the following standard.

A: Maintains film state as a single film (has free-standing ability)

B: Does not maintain film state as a single film (does not have free-standing ability)

<Electrical Conductivity>

The electrical conductivity of a produced carbon sheet was measured by a four-pin method (produced by Mitsubishi Chemical Analytech Co., Ltd.; product name: Loresta GX).

<Porosity>

The porosity of a produced carbon sheet was measured by mercury intrusion porosimetry (AutoPore IV 9510 produced by Shimadzu Corporation).

<Air Permeability>

The air permeability of a produced carbon sheet was measured by the Frazier method and was evaluated by the following standard. In a case in which the air permeability of the carbon sheet is not less than 5 cc/cm$^2$/s and not more than 60 cc/cm$^2$/s, a different material can be well supported up to an inner part of the sheet when the carbon sheet is used as a support for the different material. On the other hand, a different material cannot be supported up to an inner part of the carbon sheet when the air permeability is less than 5 cc/cm$^2$/s, and mechanical strength of the carbon sheet decreases when the air permeability is more than 60 cc/cm$^2$/s.

A: Air permeability of not less than 5 cc/cm$^2$/s and not more than 60 cc/cm$^2$/s B: Air permeability of less than 5 cc/cm$^2$/s or more than 60 cc/cm$^2$/s <Thickness, Density (Bulk Density), and Void Fraction>

A 1 cm square was cut out from a produced carbon sheet. The thickness of the obtained test specimen was measured using a micrometer (Digimatic Standard Outside Micrometer produced by Mitutoyo Corporation) and was taken to be the thickness of the carbon sheet.

Next, the mass (g) of the test specimen was measured, and the density (bulk density) of the carbon sheet was calculated by the following formula (1).

Carbon sheet bulk density $(g/cm^3)$=Test specimen mass $(g)/\{1\ cm^2 \times$Test specimen thickness $(cm)\}$ (1)

The obtained bulk density was then used to calculate the void fraction of the carbon sheet by the following formula (2).

Void fraction=$[1-\{$Carbon sheet bulk density $(g/cm^3)/1.3\}] \times 100$ (2)

Note that "1.3" in formula (2) is the true density $(g/cm^3)$ of carbon.

<Average Bundle Diameter of CNTs>

An obtained dispersion liquid was applied onto a silicon base plate and bundles of assembled CNTs were observed using a scanning electron microscope (SEM; JSM-7800F Prime produced by JEOL Ltd.). One hundred bundles were randomly selected, the bundle diameters thereof were measured, and an average value of the measured bundle diameters was taken to be a value for the average bundle diameter of CNTs.

<Electromagnetic Wave Absorption Characteristics>

The free space method was used to measure electromagnetic wave absorption (dB) of a produced carbon sheet in a millimeter wave band (W-band: 60 GHz to 120 GHz). Electromagnetic wave absorption characteristics of the carbon sheet were evaluated by the following standard based on results for electromagnetic wave absorption at 80 GHz and 110 GHz.

A: Electromagnetic wave absorption of 5 dB or more
B: Electromagnetic wave absorption of less than 5 dB <Infrared Absorption Characteristics>

Infrared absorption (%) of a produced carbon sheet in a range of 3 μm to 15 μm was measured by total reflection measurement using an integrating sphere. Infrared absorption characteristics of the carbon sheet were evaluated by the following standard.

A: Infrared absorption of 90% or more
B: Infrared absorption of less than 90%

Example 1-1

<Production of Carbon Sheet>

A coarse dispersion liquid was obtained by weighing out 400 mg of CNTs (produced by Zeon Nanotechnology Co., Ltd.; product name: ZEONANO® SG101 (ZEONANO is a registered trademark in Japan, other countries, or both); SGCNTs including mainly single-walled CNTs; average diameter: 3.3 nm; nitrogen adsorption specific surface area: 1,000 $m^2/g$ or more) and 100 mg in terms of solid content of a hollow latex (Nipol MH5055 produced by ZEON CORPORATION; average particle diameter: 500 nm) as spacer particles, mixing these materials in 2 L of methyl ethyl ketone as a solvent, and then performing stirring thereof for 2 minutes using a homogenizer. A wet-type jet mill (JN-20 produced by Jokoh Co., Ltd.) was used to disperse the CNTs in the methyl ethyl ketone through two cycles of passing the obtained coarse dispersion liquid along a 0.5 mm flow channel of the wet-type jet mill at a pressure of 100 MPa so as to obtain a dispersion liquid A. The obtained dispersion liquid A was filtered under reduced pressure using Kiriyama filter paper (No. 5A) to obtain a primary sheet.

The obtained primary sheet was subjected to 12 hours of heat treatment at 350° C. to remove the hollow latex particles and obtain a carbon sheet having a thickness of 100 μm and a density of 1.15 $g/cm^3$.

The obtained carbon sheet was used to evaluate free-standing ability, electrical conductivity, porosity, and air permeability of the sheet. The results are shown in Table 1.

<Production of Metal Oxide-Supporting Sheet>

A solution of 2 g of titanium(IV) butoxide (produced by Wako Pure Chemical Industries, Ltd.) and 20 g of isopropyl alcohol was prepared, a 20 mm square of the produced carbon sheet was immersed in this solution, and treatment thereof was performed for 10 minutes in a planetary mill (Thinky Mixer AR-100 produced by Thinky Corporation). Next, a solution of 0.5 g of lithium acetate (produced by Tokyo Chemical Industry Co., Ltd.), 1 g of acetic acid, 1 g of pure water, and 3 g of isopropyl alcohol was added, and a further 10 minutes of treatment was performed. Thereafter, the produced carbon sheet was removed from the planetary mill, was dried under reduced pressure at 80° C. for 10 hours, and was subsequently heat treated at 400° C. in a nitrogen atmosphere to obtain a carbon sheet supporting a metal oxide (metal oxide-supporting sheet). A cross-section of the produced metal oxide-supporting sheet was cut using a cryomicrotome and was then observed using a scanning electron microscope. It was confirmed that a metal oxide having an average diameter of 27 nm was supported at the sheet surface.

Examples 1-2 and 1-3

A carbon sheet was produced in the same way as in Example 1-1 and the same evaluations were performed with the exception that the additive amount of the spacer particles was changed such that the porosity of the carbon sheet was a value shown in Table 1. The results are shown in Table 1.

Moreover, treatment was performed in the same way as in Example 1-1 to produce a metal oxide-supporting sheet, and the average diameter of the metal oxide was measured. The result is shown in Table 1.

Example 1-4

A coarse dispersion liquid was obtained by weighing out 1.0 g of CNTs (produced by Zeon Nanotechnology Co., Ltd.; product name: ZEONANO® SG101; SGCNTs including mainly single-walled CNTs; average diameter: 3.3 nm; nitrogen adsorption specific surface area: 1,000 $m^2/g$ or more), and mixing these CNTs with 500 mL of a 1 mass % aqueous solution of sodium dodecylbenzenesulfonate (SDBS) as a solvent containing a dispersant.

The obtained coarse dispersion liquid was loaded into a high-pressure homogenizer (produced by Beryu corp.; product name: BERYU SYSTEM PRO) including a multistage pressure control device (multistage depressurizer) for applying back pressure during dispersing, and was subjected to dispersing treatment at a pressure of 100 MPa.

Specifically, the CNTs were dispersed by imparting shear force to the coarse dispersion liquid while also applying back pressure. Note that this dispersing treatment was performed for 10 minutes while returning out-flowing dispersion liquid back into the high-pressure homogenizer. A dispersion liquid B was obtained through the dispersing treatment described above.

Carbon paper (produced by Toray Industries, Inc.; product name: TGP-H-090; porosity: 78%) was impregnated with the obtained dispersion liquid B, and then the dispersion liquid B-impregnated carbon paper was washed with isopropyl alcohol (IPA) and pure water in this order to remove SDBS used as a dispersant. Vacuum drying was subsequently performed at 80° C. for 24 hours to obtain a carbon sheet.

The obtained carbon sheet was used to perform the same evaluations. The results are shown in Table 1.

In addition, treatment was performed in the same way as in Example 1-1 to produce a metal oxide-supporting sheet, and the average diameter of the metal oxide was measured. The result is shown in Table 1.

(Comparative Example 1-1)

A carbon sheet was produced in the same way as in Example 1-1 and the same evaluations were performed with the exception that spacer particles were not added. The results are shown in Table 1.

In addition, treatment was performed in the same way as in Example 1-1 to produce a metal oxide-supporting sheet. When the metal oxide was observed, metal oxide had not been formed in an inner part of the sheet.

Example 2-2

A carbon sheet was produced in the same way as in Example 2-1 and the same measurements and evaluations were performed with the exception that the dispersing treatment time was changed from 20 minutes to 40 minutes such that the average bundle diameter of CNTs in the obtained dispersion liquid changed from 100 μm to 1 μm. The results are shown in Table 2. The measured thickness of the obtained carbon sheet was 1,870 μm and the measured density of the obtained carbon sheet was 0.4 g/cm$^3$.

Example 2-3

A carbon sheet was produced in the same way as in Example 2-1 and the same measurements and evaluations were performed with the exception that the dispersing treatment time was changed from 20 minutes to 60 minutes such that the average bundle diameter of CNTs in the obtained dispersion liquid changed from 100 μm to 0.5 μm. The results are shown in Table 2. The measured thickness of the obtained carbon sheet was 850 μm and the measured density of the obtained carbon sheet was 0.7 g/cm$^3$.

TABLE 1

| | Sheet structure | Porosity (%) | Sheet free-standing ability | Electrical conductivity (S/cm) | Air permeability | Supported particle average diameter (nm) |
|---|---|---|---|---|---|---|
| Example 1-1 | Only CNTs | 8 | A | 150 | A | 27 |
| Example 1-2 | Only CNTs | 48 | A | 88 | A | 19 |
| Example 1-3 | Only CNTs | 70 | A | 33 | A | 15 |
| Example 1-4 | CNTs + Porous substrate made from carbon | 88 | A | 53 | A | 11 |
| Comparative Example 1-1 | Only CNTs | 0 | A | 240 | B | — |

Example 2-1

A dispersion liquid was obtained by adding 20 mg of CNTs (produced by Zeon Nanotechnology Co., Ltd.; product name: ZEONNANO® SG101; SGCNTs including mainly single-walled CNTs; average diameter: 3.3 nm; nitrogen adsorption specific surface area: 1,000 m$^2$/g or more) to 20 mL of isopropyl alcohol (IPA), and then performing dispersing treatment thereof for 20 minutes in a bath-type ultrasonic disperser. The average bundle diameter of CNTs in the obtained dispersion liquid was 100 μm. The obtained dispersion liquid was loaded into a reduced pressure filtration device including a membrane filter and was filtered at 0.09 MPa. The membrane filter was then peeled off to obtain a carbon sheet. The void fraction, electromagnetic wave absorption characteristics, and infrared absorption characteristics of the obtained carbon sheet were measured and evaluated. The results are shown in Table 2. The measured thickness of the obtained carbon sheet was 3,390 μm and the measured density of the obtained carbon sheet was 0.1 g/cm$^3$.

Comparative Example 2-1

A dispersion liquid was obtained by adding 200 mg of sodium dodecyl sulfate (Sodium Dodecyl Sulfate produced by FUJIFILM Wako Pure Chemical Corporation) as a surfactant and 20 mg of CNTs (produced by Zeon Nanotechnology Co., Ltd.; product name: ZEONNANO® SG101; SGCNTs including mainly single-walled CNTs; average diameter: 3.3 nm; nitrogen adsorption specific surface area: 1,000 m$^2$/g or more) to 20 mL of pure water, and then performing dispersing treatment thereof for 60 minutes in a bath-type ultrasonic disperser. The average bundle diameter of CNTs in the obtained dispersion liquid was 0.05 μm. The obtained dispersion liquid was loaded into a reduced pressure filtration device including a membrane filter and was filtered at 0.09 MPa. The membrane filter was then peeled off to obtain a carbon sheet. The void fraction, electromagnetic wave absorption characteristics, and infrared absorption characteristics of the obtained carbon sheet were measured and evaluated. The results are shown in Table 2. The measured thickness of the obtained carbon sheet was 102 μm and the measured density of the obtained carbon sheet was 1.0 g/cm$^3$.

TABLE 2

|  | Average bundle diameter of CNTs in dispersion liquid [μm] | Void fraction [%] | Electromagnetic wave absorption characteristics 80 GHZ | Electromagnetic wave absorption characteristics 110 GHz | Infrared absorption characteristics (3 μm to 15 μm) |
|---|---|---|---|---|---|
| Example 2-1 | 100 | 92 | A | A | A |
| Example 2-2 | 1 | 85 | A | A | A |
| Example 2-3 | 0.5 | 42 | A | A | A |
| Comparative Example 2-1 | 0.05 | 23 | B | B | B |

It can be seen from Table 1 that the carbon sheets of Examples 1-1 to 1-4, which each contain carbon nanotubes and have a porosity of not less than 5% and not more than 90%, have free-standing ability, have an air permeability within a range of 5 cc/cm$^2$/s to 60 cc/cm$^2$/s, and have supported particles observed in an inner part of the sheet when used to support a metal oxide, and thus the carbon sheets of Examples 1-1 to 1-4 are materials that have excellent handleability and processability, and that when used as a support for a different material, enable support of the different material up to an inner part thereof.

It can also be seen that compared to Examples 1-1 to 1-4, the carbon sheet of Comparative Example 1-1, which has a porosity that does not satisfy the specific range, has an air permeability that is not within the aforementioned range and does not have supported particles observed in an inner part of the sheet when the carbon sheet is used to support a metal oxide, and thus has poor performance in terms of supporting a different material up to an inner part of the carbon sheet.

It can be seen from Table 2 that the carbon sheets of Examples 2-1 to 2-3, which each contain carbon nanotubes and have a void fraction of not less than 30% and not more than 95%, have excellent electromagnetic wave absorption characteristics and infrared absorption characteristics.

It can also be seen that the carbon sheet of Comparative Example 2-1, which does not have a void fraction within the specific range, has poor electromagnetic wave absorption characteristics and infrared absorption characteristics compared to the carbon sheets of Examples 2-1 to 2-3.

INDUSTRIAL APPLICABILITY

Through the presently disclosed carbon sheet, it is possible to provide a material that has excellent handleability and processability, and that when used as a support for a different material, enables support of the different material up to an inner part thereof.

Moreover, through the presently disclosed carbon sheet, it is possible to provide a material that has excellent electromagnetic wave absorption characteristics and infrared absorption characteristics.

The invention claimed is:

1. A production method of a carbon sheet comprising: a porous substrate made from carbon; and one or more carbon nanotubes, attached to the porous substrate, and having a porosity of not less than 5% and not more than 90%,
   wherein the production method comprises:
   a dispersion liquid impregnation step of impregnating a porous substrate made from carbon with a dispersion liquid containing carbon nanotubes and a solvent, to obtain a dispersion liquid-impregnated porous substrate; and
   a solvent removal step of removing the solvent from the dispersion liquid-impregnated porous substrate.

2. The production method of the carbon sheet according to claim 1, wherein the carbon nanotubes are single-walled carbon nanotubes.

3. The production method of the carbon sheet according to claim 1, wherein the carbon nanotubes have a nitrogen adsorption specific surface area of 600 m$^2$/g or more.

4. A production method of a carbon sheet comprising one or more carbon nanotubes and having a void fraction of not less than 30% and not more than 95%,
   wherein the production method comprises:
   a dispersion liquid production step of dispersing carbon nanotubes in a solvent to obtain a dispersion liquid, wherein an average bundle diameter of the carbon nanotubes in the dispersion liquid is 0.5 μm or more and 1,000 μm or less; and
   a solvent removal step of removing the solvent from the dispersion liquid.

5. The production method of the carbon sheet according to claim 4, wherein the carbon sheet is composed of only the carbon nanotubes.

6. The production method of the carbon sheet according to claim 4, wherein the carbon nanotubes are single-walled carbon nanotubes.

7. The production method of the carbon sheet according to claim 4, wherein the carbon nanotubes have a nitrogen adsorption specific surface area of 600 m$^2$/g or more.

* * * * *